Feb. 22, 1949. J. W. F. HOLL Re. 23,086
VARIABLE DELIVERY ROTARY PUMP
Original Filed Oct. 14, 1940 2 Sheets-Sheet 1
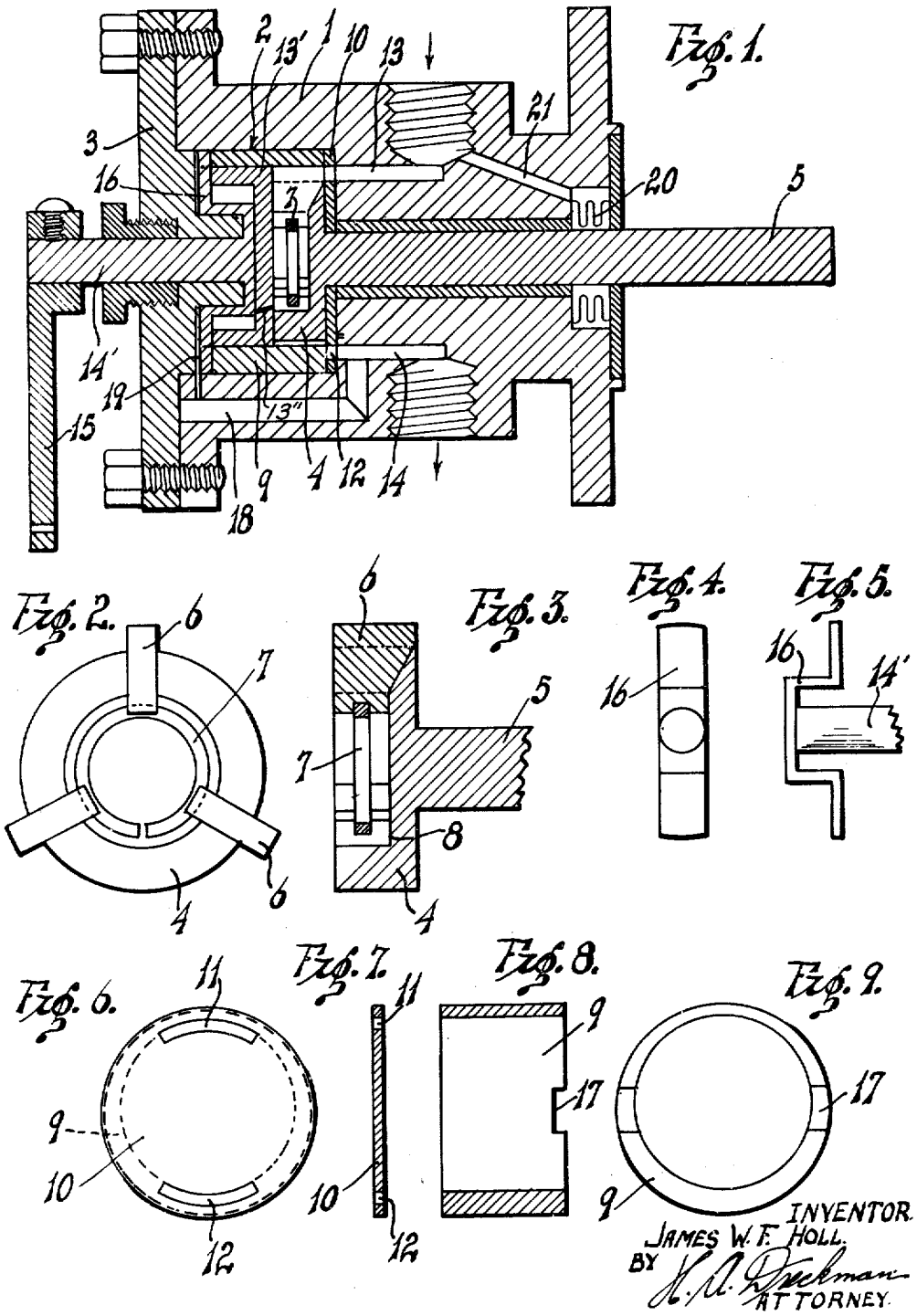

Feb. 22, 1949. J. W. F. HOLL Re. 23,086

VARIABLE DELIVERY ROTARY PUMP

Original Filed Oct. 14, 1940 2 Sheets-Sheet 2

INVENTOR.
JAMES W. F. HOLL.
BY.
H. A. Dreckman
ATTORNEY.

Reissued Feb. 22, 1949

Re. 23,086

UNITED STATES PATENT OFFICE 23,086

VARIABLE DELIVERY ROTARY PUMP

James W. F. Holl, Los Angeles, Calif.

Original No. 2,359,558, dated October 3, 1944, Serial No. 361,063, October 14, 1940. Application for reissue October 1, 1945, Serial No. 619,535

11 Claims. (Cl. 103—120)

This invention relates to a variable delivery rotary pump, the prime object of which is to provide a simple and effective means of varying the delivery of the pump by means of an exterior lever or arm.

Another object of my invention is to provide a novel means of varying the delivery of a rotary pump by rotation either of an eccentric in the pump or a ported plate.

Another object of my invention is to provide a novel means of compensating for wear and heating expansion of parts by internal hydraulic pressure against the rotor and other parts within the pump.

A feature of my invention resides in the novel blade arrangement in the rotor whereby these blades are urged against the wall of the pumping chamber by a resilient means and are also urged against the side walls of the chamber, thus enabling the pump to efficiently operate at low speeds.

Still another object of my invention is to provide a novel variable delivery rotary pump, which is also reversible by operation of an external arm or lever.

A feature of my invention resides in the ability to adjust the pump to any point between zero output and full output.

Other objects, advantages and features of invention may appear from the accompanying drawings, the subjoined detailed description, and the appended claims.

In the drawings:

Figure 1 is a longitudinal, sectional view taken in a vertical plane of my pump.

Figure 2 is an end view of the rotor.

Figure 3 is a fragmentary, vertical sectional view of the rotor.

Figure 4 is an end view of the delivery changing finger or actuator.

Figure 5 is a fragmentary, side elevation of the same.

Figure 6 is a side elevation of the ported plate.

Figure 7 is a vertical, sectional view of the same.

Figure 8 is a transverse, sectional view of the eccentric.

Figure 9 is an end view of the same.

Figure 10:
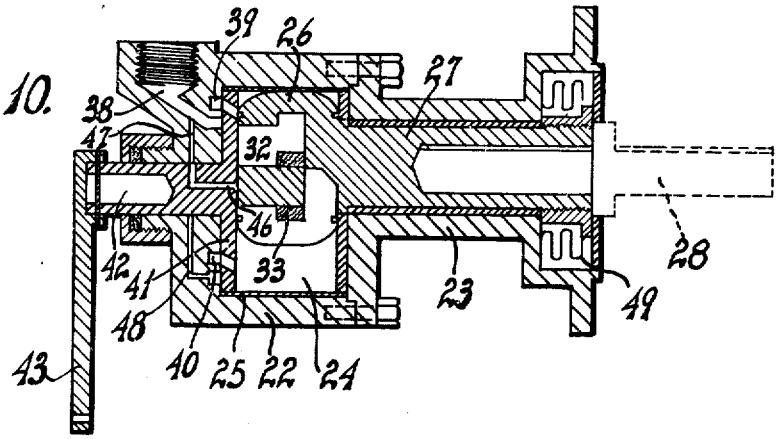
Figure 10 is a vertical, sectional view of a slightly modified form of variable delivery pump embodying my invention.

Referring more particularly to the drawings, the numeral 1 indicates a housing in which a chamber 2 is formed. The open end of the chamber 2 is closed by a head 3, which is bolted or otherwise fixedly attached to the end of the housing 1. A rotor head 4 is formed or fixedly mounted on the end of a shaft 5, the shaft protruding from the housing 1 and the head being positioned within the chamber 2 and rotatable therein, all of which is usual in the art. A suitable driving means is attached or connected to the shaft 5 at its outer end so as to rotate the runner or head 4. It is understood that the driving connection to the shaft 5 shall permit longitudinal movement of this shaft in the housing 1—that is, the shaft and head 4 will float. The purpose of this is to permit a sealing against the side walls of the rotor, as will be subsequently described.

A plurality of blades 6 are mounted in the head 4 in proper spaced relation, and these blades may be radially arranged, and also they may consist of a single block of metal, fiber, or the like, or they may be formed of a plurality of segments or strips, as will be subsequently described. An annular resilient ring 7 engages each of the blades 6 and urges these blades outwardly against the wall of the pumping chamber. It will be noted that the head 4 is undercut, as shown at 8, and the resilient spring or element 7 is positioned within this undercut portion so as to engage substantially the center of each of the blades 6. Each of the blades may be recessed or grooved to receive the spring element 7, thus insuring an even outward push against these blades, and the grooves also serving to retain the spring 7 in position.

An eccentric cylindrical pump wall sleeve 9 is mounted in the chamber 2 and closely fits the wall of this chamber, that is the outer surface of the eccentric wall fits the chamber 2. The eccentric cylindrical pump wall sleeve 9 which is concentrically disposed in chamber 2 and has an inner periphery which is eccentric to the axis of the housing and its chamber and is rotatable within the chamber 2, as will be further described. The rotor 4 is positioned within the eccentric sleeve 9, and the blades 6 are pressed against the inner wall of the eccentric. A plate 10 is mounted within the chamber 2 and positioned at the end of this chamber, the eccentric sleeve 9 being pressed endwise against this plate in a manner to be described in the following paragraphs. The plate 10 is provided with an arcuate intake port 11, and an arcuate exhaust port 12. An intake duct 13 is provided in the housing 1, and this duct extends to the port 11, and similarly an outlet duct 14 is provided in the housing, this outlet duct extending to the port 12. The plate 10 is pinned to the housing 1 so that it cannot rotate. Rotation of the eccentric sleeve 9 over the ports 11 and 12 will vary the delivery of the pump by varying the extent of opening of the ports and by varying the position of the high and low pressure sides of the pump with respect to the ports.

A cup 13' fits closely within the eccentric 9 and bears against the end of the rotor 4, substantially as shown in Fig. 4. Rotation of the eccentric sleeve 9 and the cup 13' is accomplished by the adjusting shaft 14', which extends through the head 3. A lever or arm 15 attached to the outer end of the shaft 14' enables this shaft to be rotated for the purpose of adjusting the delivery of the pump. On the inner end of the adjusting shaft 14', there is fixedly attached or integrally formed a spring finger 16. This spring finger extends outwardly and fits into notches 17 in the eccentric, thus causing the eccentric to rotate when the arm 15 is swung. The spring finger 16 is also adapted to press the eccentric sleeve 9 endwise against the plate 10 for the purpose of providing a fluid-tight seal therebetween. As will be discussed in more detail hereinafter, fluid under pressure also acts on the end of the eccentric sleeve 9 adjacent the spring finger 16 to assist the spring finger in retaining the opposite end thereof in fluid-tight engagement with the plate 10. The outer surface of the eccentric 9 is concentric with the shaft 5, and the eccentric is rotatable about the axes of the shafts 5 and 14'. The shafts 5 and 14' are preferably in alignment.

A pressure duct 18 is formed in the housing 1 and extends from the outlet 14. A port 19 extends back of the finger 16 and within the cup 13', thus introducing fluid under pressure back of the cup 13', and pressing this cup against the side of the rotor 4. The fluid under pressure also acts on the end of the eccentric sleeve 9 nearest the spring finger 16 to urge the opposite end of the sleeve into fluid-tight engagement with the plate 10. The cup 13' is also bled into the center of the rotor 4 by passage or port 13'', thereby introducing fluid under pressure into the rotor, which will assist in pressing the blades 6 outwardly. This hydraulic pressure will also hold the rotor 4 against the plate 10 at all times and will compensate for wear. The spring finger 16, as well as hydraulic pressure, will press the cup 13' against the rotor, also for the purpose of compensating for wear.

The shaft 5 is journaled in the housing 1 and an oil seal 20, of usual and well-known construction, is provided at the outer end of the housing 1 and surrounds the shaft 5. A port 21 extends from the oil seal 20 to the intake 13 of the pump for the purpose of returning any excess oil which might accumulate from the bearing of the shaft 5.

In the type of pump thus far described, and disclosed in Figures 1 to 9 inclusive, the ported plate in which the inlet and outlet ports are provided is stationary, and an eccentric is rotatably mounted adjacent to this ported plate, the end of the eccentric bearing against the plate and rotation of the eccentric will vary the size of the inlet and outlet ports through which fluid is permitted to pass.

Figure 11:
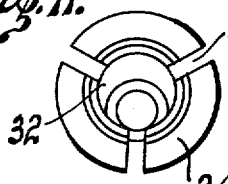
Figure 11 is an end view of the rotor.
Figure 12:
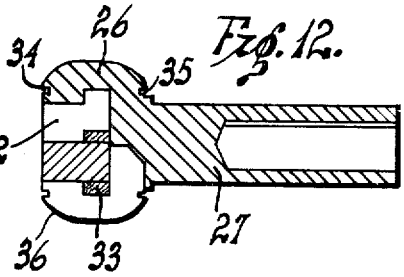
Figure 12 is a vertical sectional view of the same.
Figure 13:
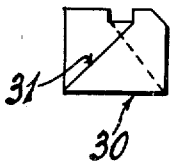
Figure 13 is a side elevation of blade pack.
Figure 14:
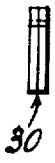
Figure 14 is an end view of the same.
Figure 15:
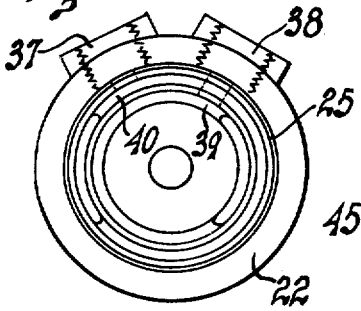
Figure 15 is an end view of the housing with the bearing portion of the housing removed, and also the rotor removed.
Figure 16:
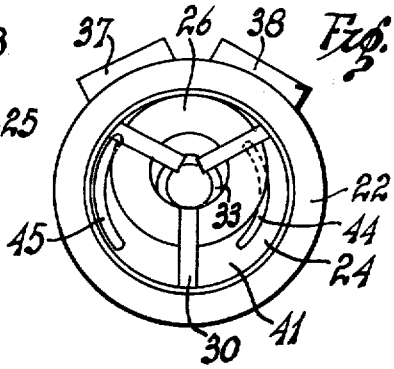
Figure 16 is a view similar to Figure 15 but with the rotor in position.
Figure 17:
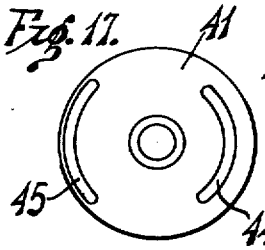
Figure 17 is a side elevation of the ported and adjustable plate.
Figure 18:
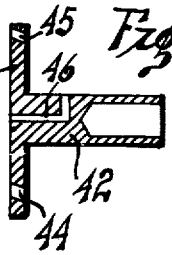
Figure 18 is a vertical, sectional view of the same.

In Figures 10 to 18 inclusive the variable delivery pump consists of a housing 22, to which a bearing head 23 is bolted or otherwise removably attached. A pumping chamber 24 is provided in the housing 22, and a sleeve 25 of hard material is pressed into this chamber for the purpose of presenting a hard-wearing surface for the rotor. The rotor includes a head 26, which is formed or mounted on the end of a shaft 27. The shaft is journaled in the bearing case 23, and is preferably splined internally to receive a suitable driving coupling 28. The head 26 is provided with a plurality of slots 29, which receive blade packs 30. These blade packs consist of a plurality of thin strips of metal, fiber or the like, each strip being arranged in pairs which are cut angularly as shown at 31, so that outward pressure against the blade pack will cause the parts of the blades to be pushed sideways against the side wall of the pumping chamber. This provides a side wall seal. The cuts 31 may be alternately arranged in the blade packs so as to prevent leakage through the blade packs. The head 26 is undercut, as shown at 32, and an annular resilient element 33 bears against each of the blade packs for the purpose of urging these blades outwardly. It is to be noted that the head 26 is eccentrically mounted in the chamber 24. The blade packs 30 are curved to receive the spring element 33 the same as previously described in Figures 1 to 9 inclusive.

The head 26 is also provided with annular grooves 34 and 35 in each wall thereof to provide an oil seal. Note also that the head is rounded, particularly at the inner end thereof, as shown at 36. This allows fluid carry-over by way of this rounded area between the blades. The housing 22 is provided with ports 37 and 38, either of which may be the intake or the outlet. The port 37 extends to an annular groove 39 in the end wall of the housing 22, and the port 38 extends to an annular groove or passage 40 also in the end wall of the housing. A plate 41 is positioned within the chamber 24, and is mounted or fixed to the inner end of an adjusting shaft 42. An adjusting arm or lever 43 is fixed to the shaft 42 for the purpose of rotating this shaft and the ported plate 41 for the purpose of varying the delivery of the pump.

The plate 41 is provided with arcuate ports 44 and 45, which coincide with the annular grooves 39 and 40 respectively. Thus, it will be evident that rotation of the shaft 42 and the plate 41 will vary the position of the arcuate ports 44 and 45 relative to the eccentrically mounted rotor 26, thus varying the delivery of the pump by varying the positions of the ports with respect to the high and low pressure sides of the pump. A 180 degree rotation will completely reverse the flow of fluid to and from the pump. A bleed port 46 is formed in the shaft 42 and extends into the chamber 24 for the purpose of introducing fluid under pressure back of the blades 30 for the purpose of urging these blades outwardly against the wall of the chamber 24. The port 46 will connect with either of the ducts 47 or 48, depending upon which is the pressure side of the pump. An oil seal 49 is provided at the outer end of the bearing housing 23 and this seal is of usual and well-known construction.

I claim:

1. A variable delivery rotary pump comprising a housing having a chamber therein and inlet and outlet ports communicating with an end of the chamber, a rotatable sleeve having an internal eccentric periphery positioned in said chamber and defining eccentric sleeve ends, a longitudinally shiftable rotor having a plurality of blades positioned within said sleeve, means connected to said rotor to effect driving of the same, a plate having ports therein disposed between said rotor and the end of said chamber with which the ports of the housing communicate and having its ports communicating with the housing ports, the respective end of said sleeve bearing against said plate, said respective end of said sleeve being arranged upon rotation thereof to cover and uncover to varying degrees said plate ports to control the extent of opening of said plate ports and consequently the fluid flow through said inlet and outlet ports, a cup slidably disposed in said sleeve adjacent the opposite end thereof and engageable by said rotor and shiftable therewith longitudinally in the sleeve, and means for turning said sleeve whereby the flow through the respective inlet and outlet ports may be varied, the housing being provided with a passage leading from its outlet port for delivering fluid under pressure against the cup and effecting shifting of the cup against the rotor in the sleeve toward the ported end of the chamber.

2. A variable delivery rotary pump comprising a housing having a chamber therein and inlet and outlet ports communicating with one end of the chamber in spaced relation to each other circumferentially thereof, a rotatable sleeve having an internal eccentric periphery positioned in said chamber and defining eccentric sleeve ends, a hollow longitudinally movable rotor having a plurality of blades positioned within said sleeve, means connected to said rotor to effect driving of the same, a plate having ports therein between said rotor and one end of said chamber, the respective end of said sleeve thus bearing against said plate, said plate ports respectively communicating with said housing ports, said respective end of said sleeve being arranged upon rotation thereof to cover and uncover to varying degrees said plate ports to control the extent of opening of said plate ports and consequently the fluid flow through said inlet and outlet ports, a cup slidably disposed in said sleeve adjacent the opposite end thereof and engageable by said rotor, a bleed port formed through the bottom of said cup providing communication between the interior of the cup and the hollow rotor, the housing being formed with a port between the cup and one of said inlet and outlet ports whereby fluid pressure built up by said rotor may act against the interiors of the cup and the rotor and press the rotor against said plate thereby compensating for wear thereof, and means for turning said sleeve whereby the flow through the respective inlet and outlet ports may be varied.

3. In a rotary pump, the combination of: a housing having a chamber therein and having inlet and outlet ports therein which communicate with said chamber, said housing having a passage therein which communicates with said outlet port in said housing and communicates with said chamber at a location which is spaced from an end thereof; a plate disposed in said chamber adjacent said end thereof, said plate having inlet and outlet ports therein which communicate with said inlet and outlet ports in said housing, respectively; a rotatable sleeve disposed in said chamber between said plate and said location at which said passage communicates with said chamber, said sleeve having an eccentric internal periphery and having an eccentric end which is adapted to engage said plate, said eccentric end being adapted to vary the opening of said inlet and outlet ports in said plate upon rotation of said sleeve; means for rotating said sleeve; a longitudinally movable rotor disposed in said sleeve, said rotor being rotatable about the axis of said chamber and being adapted for slidable engagement with said plate; a plurality of blades carried by said rotor, said blades slidably engaging said eccentric internal periphery of said sleeve and being radially movable with respect to the axis of said chamber; a longitudinally movable, cup-shaped member slidably disposed in said sleeve, said member being adapted for engagement with said rotor and said blades to urge said rotor and said blades into engagement with said plate; an means for rotating said rotor whereby fluid flows through said outlet port in said housing and through said passage into said chamber to act on said member, thereby moving said member longitudinally into engagement with said rotor to urge said rotor and said blades into engagement with said plate.

4. A rotary pump as defined in claim 3 in which said cup-shaped member is provided with a bleed port therethrough whereby fluid acting on said member flows through said bleed port and acts on said rotor to urge said rotor into engagement with said plate.

5. In a rotary pump, the combination of: a housing provided with a chamber therein and having inlet and outlet ports therein which communicate with the interior of said chamber; a sleeve in said chamber having an internal periphery which is eccentric with respect to the longitudinal axis of said chamber, one end of said sleeve being adapted to engage one end wall of said chamber and the other end of said sleeve being spaced from the other end wall of said chamber; a rotor in said sleeve engaging said one end wall of said chamber, said rotor being rotatable about said longitudinal axis of said chamber; a plurality of blades carried by said rotor, said blades engaging said eccentric internal periphery of said sleeve and said one end wall of said chamber and being movable radially with respect to said longitudinal axis of said chamber; a wall member spaced from said other end wall of said chamber and sealably engaging said sleeve, said rotor, and said blades; means connected to said rotor for effecting rotation thereof so as to deliver fluid under pressure through said outlet port; and passage means for conducting a portion of the fluid under pressure delivered by the pump into said space between said other end of said sleeve and said other end wall of said chamber whereby the fluid acts on said other end of said sleeve to retain said one end thereof in engagement with said one end wall of said chamber.

6. A rotary pump according to claim 5 wherein said wall member and said rotor are movable longitudinally, said wall member engaging said eccentric internal periphery of said sleeve, and said space between said wall member and said other end wall of said chamber communicating with said space between said other end of said sleeve and said other end wall of said chamber, whereby the fluid under pressure conducted into said space between said other end of said sleeve and said other end wall of said chamber also acts on said wall member to retain it in fluid-tight engagement with said rotor and said blades and to retain said rotor and said blades in fluid-tight engagement with said one end wall of said chamber.

7. In a variable delivery rotary pump, the combination of: a housing provided with a chamber therein and having inlet and outlet ports therein for a fluid which communicate with said chamber; a rotatable sleeve in said chamber, said sleeve having an eccentric internal periphery symmetrical about an axis which is parallel to and spaced from the longitudinal axis of said chamber, said sleeve being adapted upon rotation thereof to vary the extent of opening of said inlet and outlet ports; means for rotating said sleeve; a rotor in said sleeve, said rotor being rotatable about an axis which is parallel to and spaced from said axis about which said eccentric internal periphery of said sleeve is symmetrical, said rotor being movable along said axis of rotation thereof and being adapted to engage one end wall of said chamber; a plurality of blades carried by said rotor and movable radially with respect to said axis of rotation thereof, said blades engaging said eccentric internal periphery of said sleeve and being adapted to engage said one end wall of said chamber; a wall member which is disposed in and is movable longitudinally of said sleeve and which is spaced from the other end wall of said chamber, said wall member engaging said eccentric internal periphery of said sleeve and being adapted to engage said rotor and said blades; means operatively connected to said rotor for effecting rotation thereof whereby fluid under pressure is delivered through said outlet port; and passage means for conducting a portion of the fluid under pressure delivered by the pump into said space between said other end wall of said chamber and said movable wall member whereby the fluid acts on said movable wall member to urge it into engagement with said rotor and said blades and to urge said rotor and said blades into engagement with said one end wall of said chamber.

8. A variable delivery rotary pump according to claim 7 wherein said movable wall member is provided with a passage therethrough communicating with said space, and wherein said rotor is provided with an opening therein communicating with said passage and exposing the inner ends of said blades, whereby fluid under pressure flows from said space into said opening in said rotor by way of said passage through said movable wall member and acts on said inner ends of said blades to urge said blades outwardly into engagement with said eccentric internal periphery of said sleeve to provide a fluid-tight seal therebetween.

9. In a variable delivery rotary pump, the combination of: a housing provided with a cylindrical opening therein and having inlet and outlet ports in one end wall of said opening; a rotatable sleeve in said opening, said sleeve having an eccentric internal periphery defining a pumping chamber which is symmetrical about an axis spaced from and parallel to the axis of said opening, the position of said pumping chamber relative to said inlet and outlet ports varying upon rotation of said sleeve; a rotor in said sleeve, said rotor being rotatable about an axis which is spaced from and parallel to said axis of said pumping chamber; a plurality of blades carried by said rotor and movable radially with respect to said axis of rotation thereof, said blades slidably engaging said one end wall of said opening and said eccentric internal periphery of said sleeve; a wall member which is disposed in and is movable longitudinally of said sleeve and which is spaced from the other end wall of said chamber, said wall member engaging said eccentric internal periphery of said sleeve and being adapted to engage said blades; means operatively connected to said rotor for effecting rotation thereof whereby fluid under pressure is delivered through said outlet port; passage means for conducting a portion of the fluid under pressure delivered by the pump into said space between said other end wall of said chamber and said movable wall member whereby the fluid acts on said movable wall member to urge it into engagement with said blades; and means for rotating said sleeve to vary the position of said pumping chamber with respect to said inlet and outlet ports whereby to vary the delivery of the pump.

10. In a device of the character described, the combination of: a housing provided with a cylindrical opening therein and having fluid inlet and outlet ports therein which communicate with said opening; a rotatable sleeve in said opening, said sleeve having an eccentric internal periphery defining a pumping chamber which is symmetrical about an axis spaced from and parallel to the axis of said opening, said sleeve being adapted, upon rotation thereof, to vary the position of said pumping chamber relative to said sleeve about a rotor axis which is parallel to and spaced from the axis of symmetry of said pumping chamber and shiftable in said pumping chamber along said rotor axis, said rotor being adapted to engage one end wall of said opening; a plurality of blades carried by said rotor and movable radially with respect to said rotor axis, said blades engaging said eccentric internal periphery of said sleeve and being adapted to engage said one end wall of said opening; a wall member which is disposed in and is movable longitudinally of said sleeve and which is spaced from the other end wall of said chamber, said wall member being adapted to engage said rotor and said blades; and passage means connecting one of said ports with said space between said other end wall of said opening and said movable wall member to admit fluid from said one port into said space, whereby the fluid in said space acts on said movable wall member to urge it into engagement with said rotor and said blades and to urge said rotor and said blades into engagement with said one end wall of said opening.

11. A device as set forth in claim 10 wherein said sleeve is spaced from said other end wall of said opening and wherein said passage means connects said one port with said space between said sleeve and said other end wall of said opening to apply fluid pressure to said sleeve to urge it into engagement with said one end wall of said opening.

JAMES W. F. HOLL.

REFERENCES CITED

The following references are of record in the file of this patent:

UNITED STATES PATENTS

| Number | Name | Date |
|---|---|---|
| 944,708 | Vollmann | Dec. 28, 1909 |
| 1,074,096 | Hammer | Sept. 23, 1913 |
| 1,087,181 | Pitman | Feb. 17, 1914 |
| 1,475,683 | Carrey | Nov. 27, 1923 |
| 1,943,929 | Rayburn | Jan. 16, 1934 |
| 2,206,384 | Adler | July 2, 1940 |
| 2,312,891 | Ferris | Mar. 2, 1943 |
| 2,423,271 | Talbot | July 1, 1947 |

FOREIGN PATENTS

| Number | Country | Date |
|---|---|---|
| 7,464 | Great Britain | 1913 |
| 19,080 | Great Britain | 1912 |
| 261,248 | Germany | 1912 |
| 685,937 | Germany | 1939 |

Certificate of Correction

Reissue No. 23,086. February 22, 1949.

JAMES W. F. HOLL

It is hereby certified that errors appear in the printed specification of the above numbered patent requiring correction as follows:

Column 6, line 13, claim 3, for the words "an means" read *and means*; line 18, same claim, after "rotor" first occurrence, insert *and said blades*; column 8, line 64, list of references cited, after "Nov. 27, 1923", insert the following:

*1,737,942 Pagel.....Dec. 3, 1929* and that the said Letters Patent should be read with these corrections therein that the same may conform to the record of the case in the Patent Office.

Signed and sealed this 23rd day of August, A. D. 1949.

[SEAL]

THOMAS F. MURPHY,
*Assistant Commissioner of Patents.*